(12) United States Patent
Andersen

(10) Patent No.: US 7,948,104 B2
(45) Date of Patent: May 24, 2011

(54) METHOD OF OPERATING A WIND TURBINE WITH PITCH CONTROL, A WIND TURBINE AND A CLUSTER OF WIND TURBINES

(75) Inventor: Brian W. Andersen, Ringkobing (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/607,825

(22) Filed: Oct. 28, 2009

(65) Prior Publication Data

US 2010/0045041 A1 Feb. 25, 2010

Related U.S. Application Data

(63) Continuation of application No. PCT/DK2008/000169, filed on Apr. 30, 2008.

(30) Foreign Application Priority Data

Apr. 30, 2007 (DK) ................................. 2007 00653

(51) Int. Cl.
*F03D 9/00* (2006.01)
*H02P 9/04* (2006.01)
*B64C 11/00* (2006.01)
*B64C 27/00* (2006.01)
*F01D 5/18* (2006.01)

(52) U.S. Cl. ................................. 290/44; 290/55; 416/1

(58) Field of Classification Search .................... 290/44, 290/55; 416/1
See application file for complete search history.

(56) References Cited

U.S. PATENT DOCUMENTS

| 2,344,668 | A | * | 3/1944 | Axtmann | 33/229 |
|---|---|---|---|---|---|
| 3,032,698 | A | * | 5/1962 | Long et al. | 322/19 |
| 4,329,117 | A | * | 5/1982 | Doman | 416/170 R |
| 4,490,093 | A | * | 12/1984 | Chertok et al. | 416/26 |
| 4,511,807 | A | * | 4/1985 | Somerville | 290/44 |
| 4,525,633 | A | * | 6/1985 | Wertheim et al. | 290/44 |
| 4,695,736 | A | * | 9/1987 | Doman et al. | 290/44 |
| 4,700,081 | A | * | 10/1987 | Kos et al. | 290/44 |
| 4,703,189 | A | * | 10/1987 | DiValentin et al. | 290/44 |
| 5,155,375 | A | * | 10/1992 | Holley | 290/44 |
| 6,320,272 | B1 | * | 11/2001 | Lading et al. | 290/44 |
| 6,891,281 | B2 | * | 5/2005 | Wobben | 290/44 |
| 7,042,110 | B2 | * | 5/2006 | Mikhail et al. | 290/44 |

(Continued)

FOREIGN PATENT DOCUMENTS

DE 102004054608 A1 3/2006

(Continued)

OTHER PUBLICATIONS

J. Ekanayake, L. Holdsworth, N. Jenkins: "Control of DFIG wind turbines" Power Engineer, vol. 17, No. 1, Feb. 2003, pp. 28-32, XP002514349 the whole document.

(Continued)

*Primary Examiner* — Pedro J Cuevas
(74) *Attorney, Agent, or Firm* — St. Onge Steward Johnston & Reens LLC

(57) ABSTRACT

A method of operating a wind turbine with pitch control, in which values of the generated power and the operating speed of the rotor are established at a discrete number of secure ranges for wind speeds above a critical wind velocity. A wind turbine and a cluster of wind turbines employing such a method are also contemplated.

22 Claims, 7 Drawing Sheets

U.S. PATENT DOCUMENTS

| | | | |
|---|---|---|---|
| 7,279,802 B2 * | 10/2007 | Pasuri | 290/44 |
| 7,304,400 B2 * | 12/2007 | Kang et al. | 290/44 |
| 7,345,373 B2 * | 3/2008 | Delmerico et al. | 290/44 |
| 7,352,075 B2 * | 4/2008 | Willey et al. | 290/44 |
| 7,476,985 B2 * | 1/2009 | Llorente Gonzalez | 290/44 |
| 7,528,496 B2 * | 5/2009 | Fortmann | 290/44 |
| 7,602,075 B2 * | 10/2009 | Erdman et al. | 290/44 |
| 7,629,702 B2 * | 12/2009 | Schubert | 290/44 |
| 7,638,893 B2 * | 12/2009 | Wobben | 290/55 |
| 7,704,043 B2 * | 4/2010 | Kabatzke et al. | 416/1 |
| 7,800,242 B2 * | 9/2010 | Stiesdal | 290/44 |
| 7,823,437 B2 * | 11/2010 | Siebers et al. | 73/1.37 |
| 2007/0194574 A1 * | 8/2007 | Kabatzke et al. | 290/44 |
| 2007/0205602 A1 * | 9/2007 | Willey et al. | 290/44 |
| 2007/0216166 A1 | 9/2007 | Schubert | 290/55 |
| 2008/0042441 A1 * | 2/2008 | Kabatzke | 290/44 |
| 2008/0093856 A1 * | 4/2008 | Stiesdal | 290/44 |
| 2008/0093857 A1 * | 4/2008 | Stiesdal | 290/44 |
| 2008/0258810 A1 * | 10/2008 | Elia | 330/53 |
| 2010/0040468 A1 * | 2/2010 | Andersen et al. | 416/1 |
| 2010/0298995 A1 * | 11/2010 | Zhang et al. | 700/287 |

FOREIGN PATENT DOCUMENTS

| | | |
|---|---|---|
| EP | 0847496 B1 | 8/2000 |
| EP | 1467463 A1 | 10/2004 |
| EP | 1770278 A2 | 4/2007 |
| EP | 1914419 A1 | 4/2008 |
| JP | 59176473 A | 10/1984 |
| JP | 60150481 A | 8/1985 |
| NL | 8603304 A | 7/1988 |
| WO | 0133075 A1 | 5/2001 |
| WO | 2004098968 A1 | 11/2004 |

OTHER PUBLICATIONS

International Preliminary Report on Patentability; PCT/DK2008/000169; Aug. 17, 2009; 11 pages.

International Search Report and Written Opinion of the International Searching Authority; PCT/DK2008/000169; Feb. 11, 2009; 17 pages.

Tapia A et al: "Modeling and dynamic regulation of a wind farm" Power Electronics Congress, 2000. CIEP 2000. VII IEEE International Oct. 15-19, 2000, Piscataway, NJ, USA,IEEE, Oct. 15, 2000, pp. 293-297, XP010527924 ISBN: 978-0-7803-6489-9 the whole document.

Poul Sorensen, A.D. Hansen, F. IOV: "Modeling of wind farm controllers" Dynamic Models of Wind Farms For Power System Studies—IEA Wind R&D—Annex 21 Workshop EWEC 2006, [Online] Feb. 28, 2006, XP002514348 Retrieved from the Internet: URL:http://www.ewec2006proceedings.info/allfiles2/959_Ewec2006fullpaper.pdf> [retrieved on Feb. 10, 2009] the whole document.

* cited by examiner

METHOD OF OPERATING A WIND TURBINE WITH PITCH CONTROL, A WIND TURBINE AND A CLUSTER OF WIND TURBINES

CROSS-REFERENCE TO RELATED APPLICATIONS

The present application is a continuation of pending International patent application PCT/DK2008/000169 filed on Apr. 30, 2008 which designates the United States and claims priority from Danish patent application PA 2007 00653 filed on Apr. 30, 2007, the content of which is incorporated herein by reference.

FIELD OF THE INVENTION

The invention relates to a method of operating a wind turbine with pitch control. The invention relates also to a wind turbine and cluster of wind turbines.

BACKGROUND OF THE INVENTION

Hard weather conditions such as high wind speeds, have high impact on exposed wind turbines causing major loads on its components as the excessive aero dynamical power of the wind acting on the wind turbine rotor.

Various methods of prior art have been to cut-off the wind turbine from the grid e.g. at a predefined stop wind speed or to reduce the power and/or the rotational speed of the rotor proportional to an increase in wind speed above a predefined "roll off" wind speed.

EP 0847496 discloses a wind turbine control method implying that the rotor speed as well as the power of a gearless wind turbine may be reduced continuously above a critical wind speed in order to avail the wind turbine to operate at an extended wind velocity range.

A problem related to this technique is that the control algorithms must be extremely fast within the extended wind velocity range as fluctuations in wind energy at the relevant high wind velocity may both appear very sudden and involve extreme sudden variations in the rotational speed of the wind turbine.

Fluctuations in wind energy may be less critical when applying the method in gear-less wind turbines while application in connection with a wind turbine including a gear is highly problematic as a continuous reduction of wind turbine rotor speed in relation to increasing wind velocity may require that the control is extremely fast as the possible fluctuations in energy increases critically while exceeding a certain point, e.g. 25 m/s.

A further problem related to EP 0847496 is that control algorithms invokes that the up-down regulation is fast and continuous, resulting in high loads on wind turbine components.

It is an object of the present invention to provide an advantageous method of operating a wind turbine during high wind conditions without the above mentioned disadvantages.

SUMMARY OF THE INVENTION

The present invention relates to a method of operating a pitch controlled wind turbine, in which the power of the wind turbine is non-continuously reduced when a critical wind velocity is reached. By the term "critical wind velocity" is meant a predefined wind velocity value. This value may typically designate a predefined wind velocity value above which forces of the wind affecting the rotor and loads affecting wind turbine components will have the risk of damaging said wind turbine components if the wind turbine is kept in normal operation such as at rated power level.

By the invention it is ensured that the wind turbine, during high wind situations, is operated at values where components of the wind turbine experience loads that are well within their extreme load limits. Therefore fluctuations in the wind, such as suddenly changing in wind speeds or a sudden changing wind direction does not have major load impact on the components such as rotor blades, pitch or yaw mechanism, gear box etc. as to force them to exceed their load limits.

An advantage of an embodiment of the invention is that torque on the drive train of the turbine may be controlled efficiently such as to avoid gear backlash and therefore reduce the requirement to the design specifications. Furthermore it is ensured that the wind turbine stay connected to the utility grid even at very high wind speeds and even further a continued power production is established.

In one aspect of the invention said non-continuous reduction is performed in secure ranges, wherein said secure ranges comprise wind velocity ranges where the power is controlled to be substantially constant.

The term secure range simply designates a range of wind velocity in which a control parameter is subject to a predefined control strategy related to the specified range of wind velocity. This may e.g. imply that a control parameter may be kept at a constant level to obtain the non-continuous reduction in a stepwise manner. Alternatively, such control strategy may imply a part of the overall non-continuous reduction of the relevant control parameter. Such control parameter may e.g. be generated power and operating speed of the rotor.

Hereby it is ensured that the wind turbine, during high wind situations, is operated at values where components of the wind turbine experience loads that are well within their extreme load limits. Therefore fluctuations in the wind, such as suddenly changing in wind speeds or a sudden changing wind direction does not have major load impact on the components such as rotor blades, pitch or yaw mechanism, gear box etc. as to force them to exceed their load limits.

By operating the wind turbine at secure ranges it is furthermore ensured that the control of the wind turbine, if it experience e.g. a fault on the utility grid at a high wind situation, is still feasible as the wind turbine is not operated near its extreme limits.

In another aspect of the invention said non-continuous reduction is performed in secure ranges, wherein said secure ranges comprise wind velocity ranges where the power is controlled to be substantially constant with respect to an average representation or measure of power over a predefined period of time.

In yet another aspect of the invention said non-continuous reduction is performed in secure ranges, wherein said secure ranges comprise wind velocity ranges where the power is controlled to be substantially constant with respect to an average representation or measure of power over a first predefined period of time and wherein said power is controlled to allow a variation with respect to an average representation or measure of power over a following predefined period of time, wherein said following predefined period of time is shorter than said first period of time.

In an aspect of the invention, said non-continuous reduction is performed in secure ranges, wherein said secure ranges comprise wind velocity ranges where the power vary within the range. It is hereby ensured that the power level can be kept well within a level where resulting loads on wind turbine components are acceptable and do not reach fatigue levels.

In another aspect of the invention, said non-continuous reduction is performed in secure ranges, wherein said secure ranges comprise wind velocity ranges where the operational speed of the rotor vary within the range. It is hereby ensured that variations in the wind that generates varying rotor speeds over time is operational accepted.

In a further aspect of the invention the operational speed of the rotor of said wind turbine is adapted to increase over a short period of time in response to a reduction of power and increased wind velocity.

In another aspect of the invention the power of the wind turbine is non-continuously reduced in one or more steps when a critical wind velocity is reached. Hereby it is ensured that e.g. the dynamics of the pitch system is minimized as said system only regulates for alternating wind and/or load situations without the addition of further dynamics. This in turns protects the wind turbine pitch mechanics. As an example, for a wind turbine a first step of reducing the power can be a reduction by e.g. 5% of nominal generated power In another aspect of the invention said steps represents a first average representation of measured power.

In another aspect of the invention said steps represents power set points. Hereby it is ensured that said wind turbine controllers have established and well defined input settings and that the hardness or speed of regulation can be controlled by said controllers.

In a further aspect of the invention said secure ranges comprise hysteresis for a decreasing wind velocity. A system with hysteresis is interpreted as a system that exhibits path-dependence behaviour. In that case, the output of the system can be predicted at some instant in time, given only the input to the system at that instant. If a system has hysteresis then the output of the system can not be predicted at some instant in time, given only the input of the system. It is therefore not possible to predict the output without looking at the history of the input i.e. look at the path that the input followed before it reached its current value. Hereby it is ensured that the control of the wind turbine does not alternate between e.g. two secure ranges of operation, as the wind velocity changes above and beneath a step-point between two ranges. As an example when the reduction to a first level at a first secure range is obtained as the wind velocity reaches a critical wind velocity of e.g. 25 m/s, the returning to nominal level will not be performed until the wind velocity has decreased to e.g. 20 m/s. Bu the invention it is ensured that the hardness or speed of regulation in said step-points may be reduced under extreme wind situations and that loads on wind turbine components are reduced.

In another aspect of the invention said hysteresis is established in relation to parameters of the wind. Hereby it is ensured that the values of hysteresis can be adapted as to fit different weather situations e.g. expanded for wind situations comprising large fluctuations in the wind in such a way, that the wind turbine is experiencing only a minimum number of control shifts between secure ranges. Furthermore it is ensured that said hysteresis can be controlled in relation to other parameters such as wind direction, wind velocity and estimated parameters.

In yet another aspect of the invention the levels of said secure ranges are defined in relation to the fluctuation in the wind. Hereby it is ensured that operating parameters of the wind turbine such as generated power and rotor operating speed can be controlled in relation to actual experienced weather conditions such as wind velocity i.e. secure ranges are established at values defined by weather dependent parameters. Furthermore it is ensured that parameters of the wind turbine such as generated power can be optimized (maximized) for a given weather condition as to give e.g. the best obtainable power production, taking into account that fundamental secure ranges are established. As an example, for a wind turbine operating in conditions comprising low levels of fluctuations in the wind, the level of the power e.g. at the first secure range be a reduction of by e.g. 5% of nominal generated power. For a wind turbine operating in conditions comprising high levels of fluctuations in the wind, the level of the power at a first secure range can be a reduction by e.g. 20% of nominal generated power.

In another aspect of the invention said steps are established at a discrete number of values dependent on the fluctuation in the wind. Hereby it is ensured that parameters of the wind turbine such as generated power can be optimized (maximized) for a given weather condition as to give e.g. the best obtainable power production, taking into account that a number of fundamental secure ranges are established and that the wind turbine is controlled well within the margin of the extreme load limits of the wind turbine components.

In another aspect of the invention said discrete number is in the range of 1 to 10, preferable in the range 2 to 5 such as 3.

In another aspect of the invention the value of said critical wind velocity is dependent on the fluctuation in the wind. Hereby it is ensured that the wind turbine is always operated at secure operating parameters and that components of the wind turbine experience loads due to high wind situations that are at a margin well within the extreme load limits of said components. Furthermore it is ensured that said critical wind velocity is dependent on the actual wind situation.

In another aspect of the invention the value of said critical wind velocity is defined dependent on forecasts of the wind. Hereby it is ensured that the wind turbine can be prepared as to operate at control values that can control the loads on the wind turbine so that no or substantially no sudden change or fluctuation in weather condition can force the wind turbine to operate close to its extreme limits such as load limits.

In another aspect of the invention the value of said critical wind velocity is established as/on the basis of—an average of actual wind velocity measurements. Hereby it is ensured that parameters of the wind turbine controller are kept steady at levels defined by averaging actual wind velocity measurements and that said parameters of the wind turbine controller does not fluctuate in relation to the wind forcing loads on wind turbine components to fluctuate accordingly.

The invention also relates to a wind turbine for performing the method as described above.

In one aspect of the invention said wind turbine is a double fed induction generator (DFIG) wind turbine. Hereby it is ensured that wind turbines comprising a gear can take advantage of the invention and can be operated at high wind situations without extreme high torque on said gear.

Even further the invention relates to a cluster of wind turbines comprising two or more wind turbines as claimed.

In another aspect of the invention the wind velocity is measured centrally.

In a further aspect of the invention control parameters such as said discrete number, said values of hysteresis and/or said critical wind velocity are determined centrally.

BRIEF DESCRIPTION OF THE DRAWINGS

The invention will be described in the following with reference to the figures in which.

DETAILED DESCRIPTION OF THE INVENTION

Figure 1:
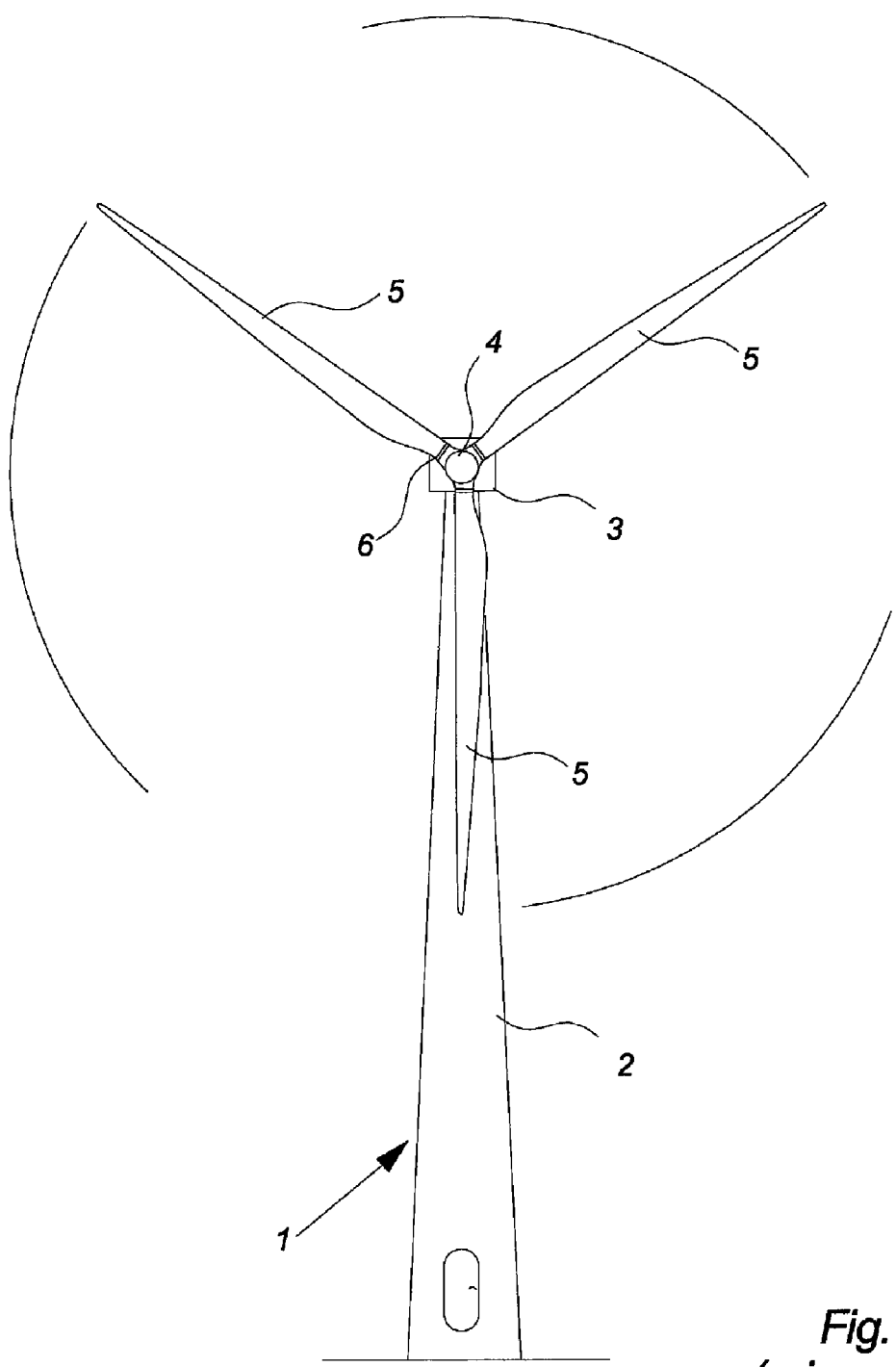
FIG. 1 illustrates a large modern wind turbine as seen from the front.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and individual pitch actuating means which allows the blade to pitch. The pitch process is controlled by a wind turbine controller comprising a pitch controller.

As indicated on the figure, wind over a certain level will activate the rotor and allow it to rotate in a substantially perpendicular direction to the wind. The rotation movement is converted to electric power which usually is supplied to the utility grid as will be known by skilled persons within the area.

Figure 2A:
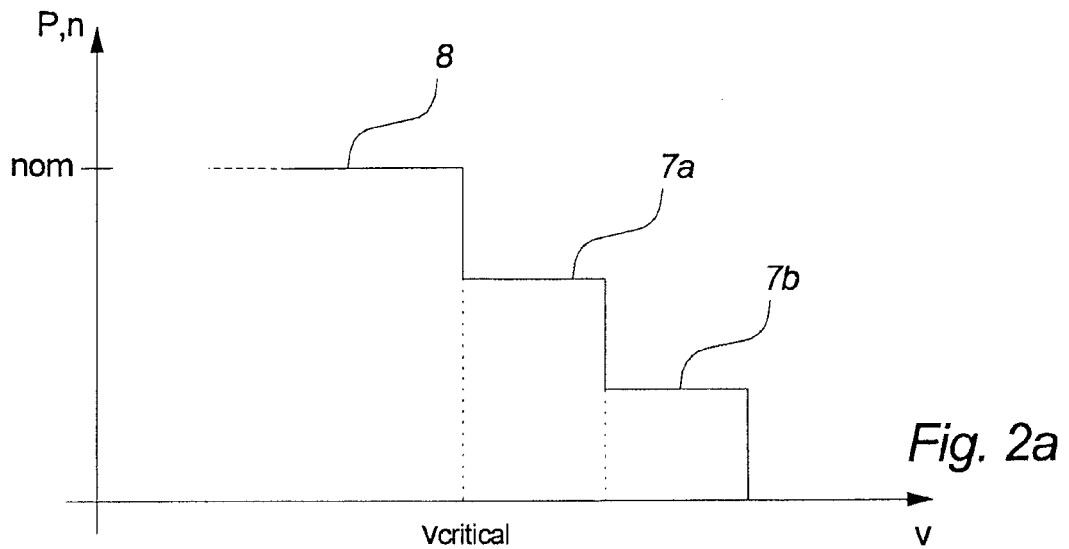
FIG. 2a illustrates schematically according to the invention, the generated power and the operating speed of the rotor sequentially established at flat levels at a discrete number of secure ranges for wind speeds above a critical wind velocity.

FIG. 2a illustrates the principle of one embodiment of the present invention where secure ranges 7 are established for parameters of the wind turbine such as generated power (P) and/or operating speed of the rotor (n).

During normal operation e.g. during normal weather situations where wind velocities are below a critical level for the wind turbine, parameters of the production such as operating speed of the rotor and generated power are kept at some nominal range 8 as to supply sufficient and required power to the utility grid.

For this level of operation loads on wind turbine components such as rotor blades pitch and yaw mechanism, rotor shaft, gearbox, bearings etc. are at levels well within the limit values of their load capacity and load extremes.

As the wind velocity increases, at some point the velocity will rise to a critical velocity $v_{critical}$ where components of the wind turbine experience excessive loads due to the aero dynamical energy in the wind. The excessive loads may in worst case situations induce damages to said components and must therefore be avoided.

According to the invention, at wind velocities at or above said $v_{critical}$, parameters of the wind turbine will be established at secure ranges of operation where said loads on the wind turbine components due to dynamical energy in the wind are decreased.

For various embodiments of the invention the wind velocity is calculated as a time average of actual wind measurements. The time range for averaging can be altered as to suit various wind situations and can as an example for normal wind situations be a calculated average of wind measurements in the range of 30 to 700 seconds such as 100 seconds or 600 seconds For embodiments where the wind comprise a relative high component of wind fluctuations and the possibility of approaching critical load limits of wind turbine components is increased, the time range can be decreased and can be e.g. 30 seconds.

For various embodiments of the invention, said secure ranges are flat ranges as indicated on FIG. 2a i.e. discontinued ranges where values of operation such as generated power and operational speed of the rotor are kept on a substantially constant level within the range.

Figure 2B:
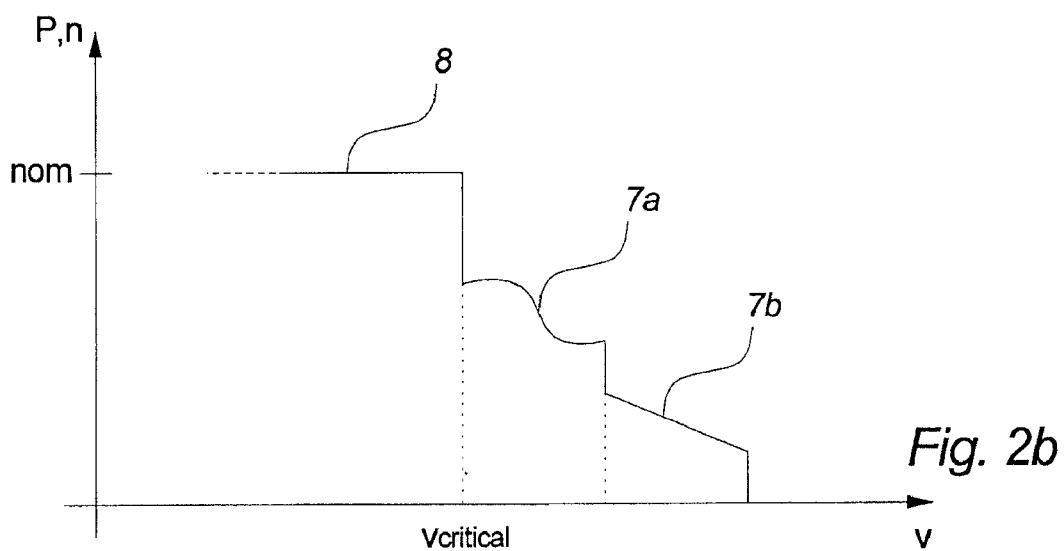
FIG. 2b illustrates schematically according to the invention, the generated power and the operating speed of the rotor sequentially established at varying levels at a discrete number of secure ranges for wind speeds above a critical wind velocity.

For other embodiments of the invention, said secure ranges are representing non-flat ranges as indicated on FIG. 2b i.e. discontinued ranges where values of operation such as generated power and operational speed of the rotor can vary within the range.

Figure 2C:
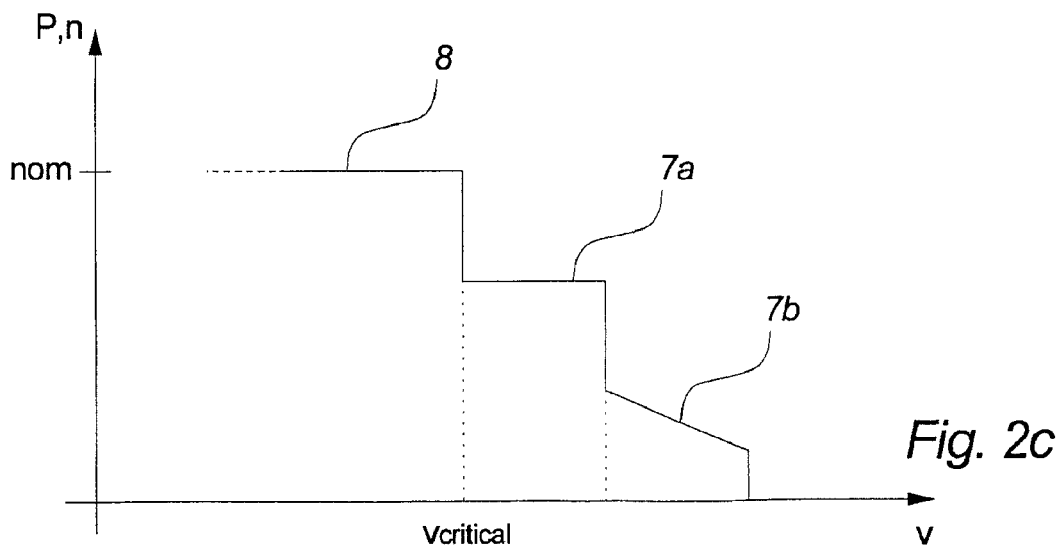
FIG. 2c illustrates schematically according to the invention, the generated power and the operating speed of the rotor sequentially established at a combination of flat and varying levels at a discrete number of secure ranges for wind speeds above a critical wind velocity.

For even further embodiments of the invention, said secure ranges are combinations of said flat and non-flat ranges, as indicated on FIG. 2c.

For one embodiment of the invention values of operation are set points for one or more wind turbine controllers.

Figure 3A:
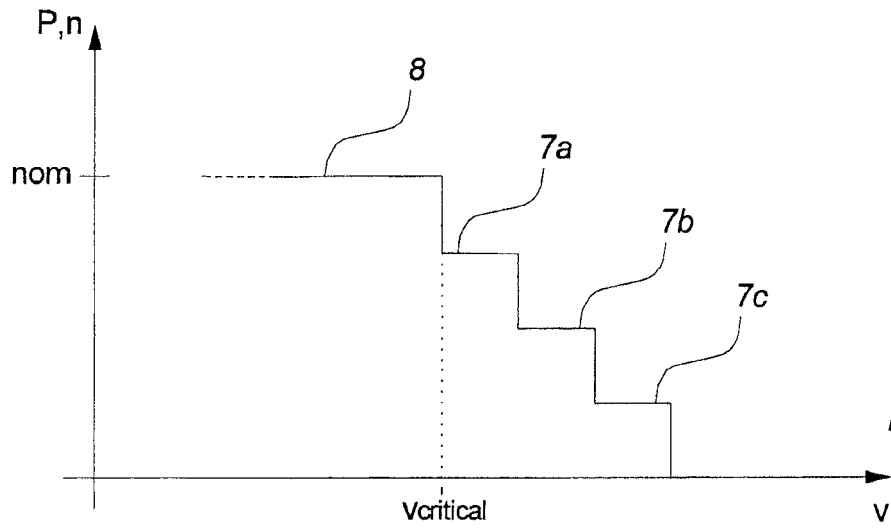
FIG. 3a illustrates schematically according to the invention, the generated power and the operating speed of the rotor sequentially established at a different discrete number of secure ranges for wind speeds above a critical wind velocity.

FIG. 3a illustrates for one embodiment of the invention, a discrete number of secure ranges 7 established for parameters of the wind turbine. The figure indicates by comparison to FIG. 2 that the value of said discrete number can vary and be chosen according to various control parameters such as the fluctuation in the wind, hardness or speed of regulation, level of security margin, power request etc.

For various embodiments of the invention, said discrete number is in the range of 1 to 10, preferable in the range 2 to 5 such as 3.

For one embodiment of the invention said discrete number is fixed.

Figure 3B:
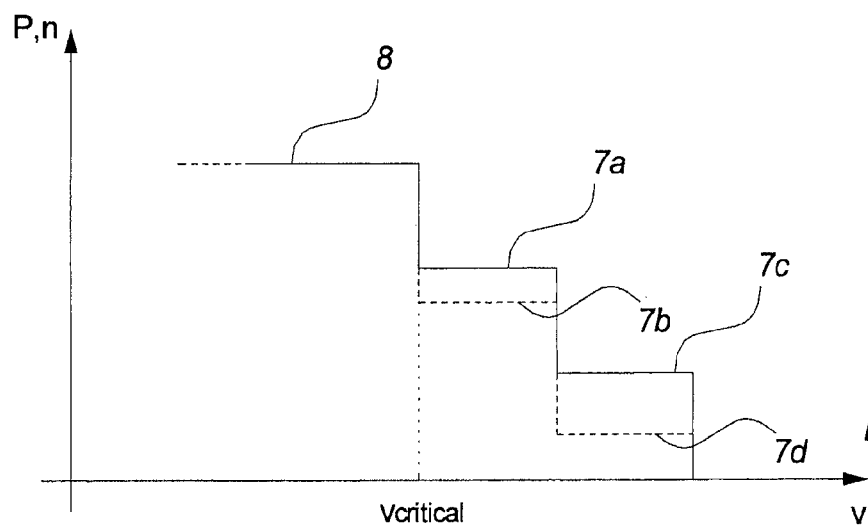
FIG. 3b illustrates according to the invention, levels of secure ranges defined in relation to the fluctuation in the wind.

FIG. 3b illustrates for embodiments of the invention that the values at which the discrete number of secure ranges are established can be altered dependent on various parameters e.g. fluctuation in the wind, hardness or speed of regulation, level of security margin, power request, weather situation, load impact on turbine components etc.

As an example, for a first weather situation, the secure ranges for generated power P and operating speed of the rotor n are established at values indicated by 7a and 7c. For a second weather situation, e.g. where the content of fluctuating wind energy is increased, the secure ranges are established at different values indicated by 7b and 7d as to minimize the generated power of the wind turbine and decrease the operational speed of the rotor, compared to said first weather situation.

For one embodiment of the invention said values at which the discrete number of secure ranges is established are fixed.

Figure 3C:
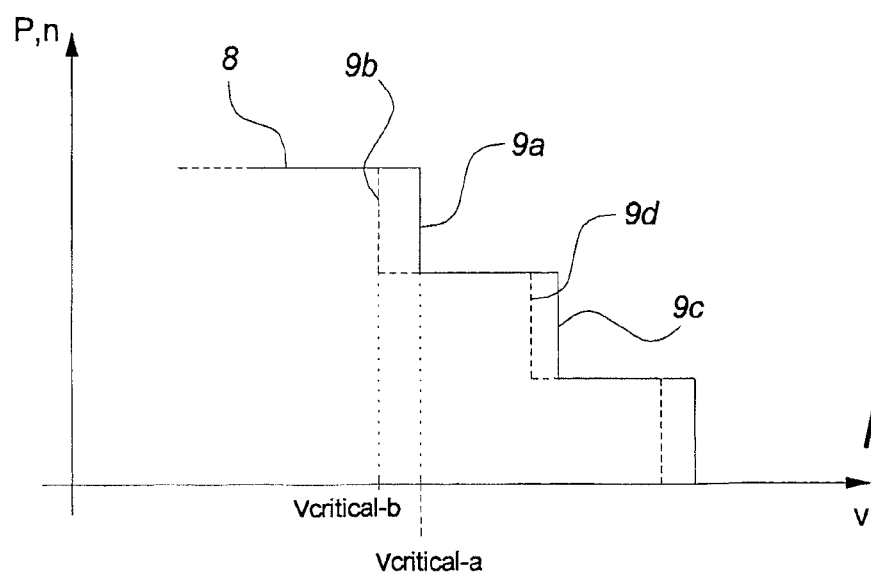
FIG. 3c illustrates according to the invention, values of critical wind velocities dependent on fluctuations of the wind.

FIG. 3c illustrates for one embodiment of the invention, that the values at which said critical wind velocity $v_{critical}$ is established as well as every other step between secure ranges can be altered dependent on various parameters e.g. fluctuation in the wind, hardness or speed of regulation, level of security margin, power request, weather situation, load impact on turbine components etc.

As an example, for a first weather situation, the critical wind velocity $v_{critical-a}$ is established at a value indicated by 9a. For a second weather situation, e.g. where the content of fluctuating wind energy is increased, the critical wind velocity value where components of the wind turbine experience excessive critical loads due to the aero dynamical energy in the wind, the critical wind velocity $v_{critical-b}$ is established at a different value indicated by 9b. The same approach may apply to every other step between secure ranges as indicated by 9c and 9d.

For one embodiment of the invention said values of wind velocities defining steps between secure ranges are fixed.

Figure 4A:
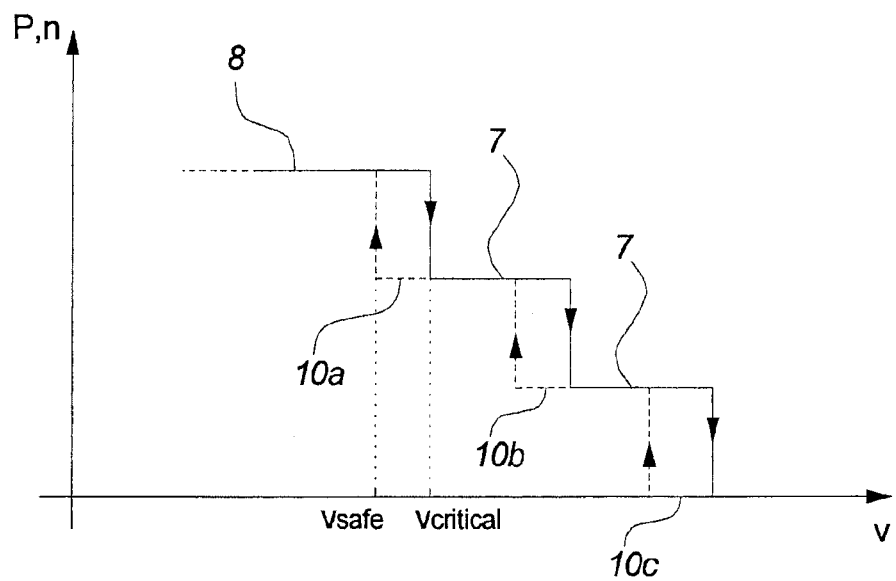
FIG. 4a illustrates schematically according to the invention, secure ranges comprising hysteresis for decreasing wind velocity above said critical wind velocity.

FIG. 4a illustrates according to embodiments of the invention, a discrete number of secure ranges 7 established for parameters of the wind turbine, for wind velocities above a critical wind velocity $v_{critical}$. As parameters of the wind turbine have been established at a secure level 7 it is avoided that the wind turbine 1 is regulated alternating between e.g. two secure ranges 7 for wind velocities fluctuating around e.g. said critical wind velocity, by establishing a secure range dependent hysteresis 10a, 10b on each secure range 7. For this embodiment parameters of the wind turbine will be re-established at previous levels of operation only when the actual wind speed is a hysteresis value lower i.e. $v_{safe}$.

The same approach may apply to every other step and hysteresis of the secure ranges as indicated by 10b and 10c.

Figure 4B:
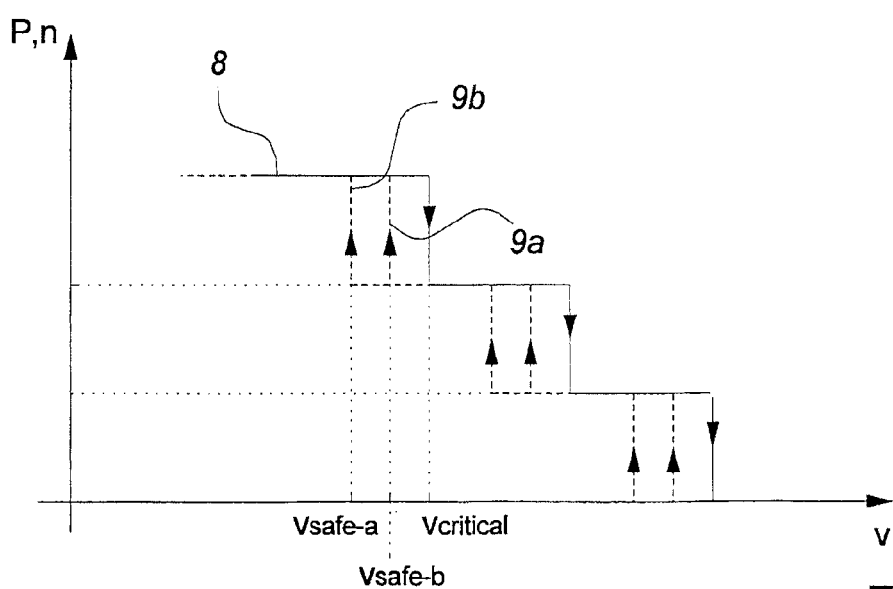
FIG. 4b illustrates schematically according to the invention, hysteresis established at secure ranges in relation to fluctuations of the wind.

FIG. 4b illustrates for other embodiments of the invention, that the range dependent hysteresis values can be altered dependent on various parameters e.g. fluctuation in the wind, hardness or speed of regulation, level of security margin, power request, weather situation, load impact on turbine components etc.

As an example for a first weather situation where the fluctuations in the wind is high, a relative high value of hysteresis is desired, parameters of the wind turbine will be re-established at e.g. nominal values at a wind velocity of $v_{safe-a}$. For another weather situation where the fluctuations in the wind is lower than at first weather situation, the value of hysteresis can be minimized ad parameters of the wind turbine can be re-established at a wind velocity of $v_{safe-b}$.

Figure 5:
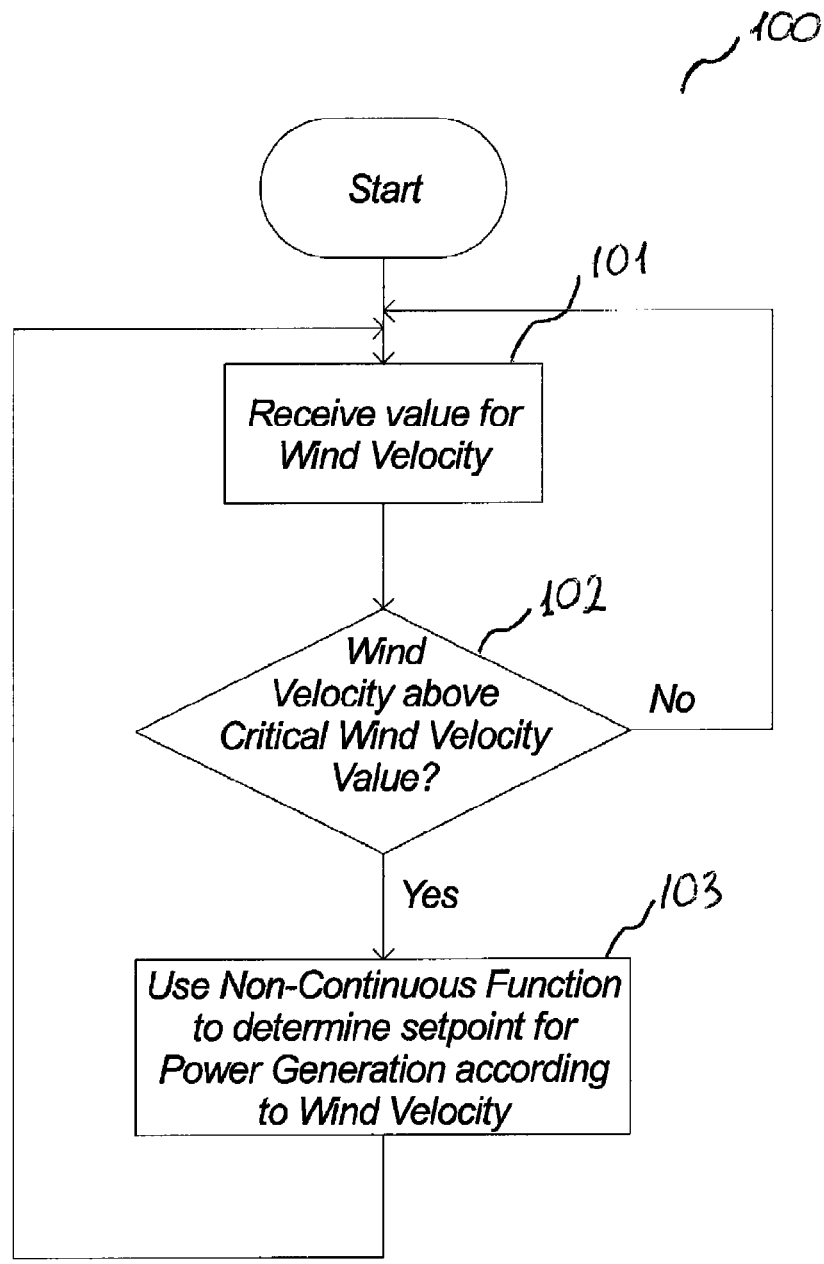
FIG. 5 illustrates the steps of the method according to the invention.

FIG. 5 illustrates the steps of the method 100 of operating a pitch controlled wind turbine at a wind velocity above a critical wind velocity value according to the present invention. First, a step of receiving a value for wind velocity 101 is performed. Next, the obtained wind velocity is analyzed 102 to determine where the wind velocity is above a critical wind velocity value. If the answer is no, the system returns back to step 101 to obtain another measurement of the wind velocity. If the answer is yes, the system proceeds to step 103 wherein a non-continuous function is used to determine a set point for power generation according to measured wind velocity. After this step is completed, the system returns back to step 101.

Figure 6:
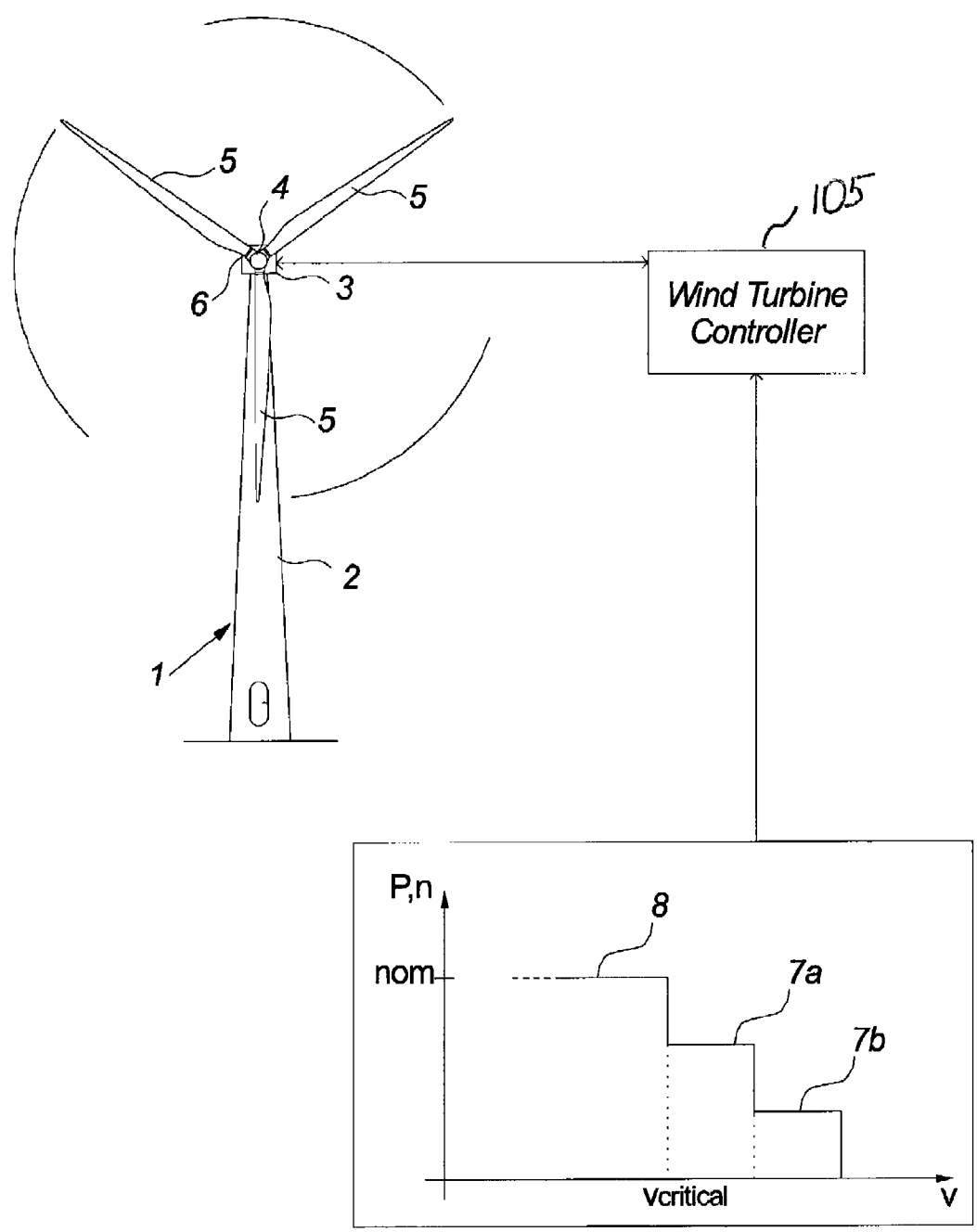
FIG. 6 illustrates schematically according to the invention, a wind turbine controller connecting the wind turbine with a non-continuous function.

FIG. 6 is a schematic illustration of a wind turbine controller 105 connecting the wind turbine 1 with a non-continuous function. The wind turbine 1 with has a tower 2 and a wind turbine nacelle 3 positioned on top of the tower. The wind turbine rotor, comprising three wind turbine blades 5, is connected to the hub 4 through pitch mechanisms 6. The pitch process is controlled by a wind turbine controller 105 comprising a pitch controller. When the wind velocity rises to a critical velocity $v_{critical}$, the wind turbine controller 105 controls the power generation from the wind turbine 1 according to a non-continuous function relating power generation (vertical axis P, n) to wind velocity (horizontal axis V). In the embodiment shown in FIG. 6, secure ranges 7 are established for parameters of the wind turbine such as generated power (P) and/or operating speed of the rotor (n). It should be noted that other types of non-continuous function, for example, such as those illustrated in FIGS. 2b-2c, 3a-3c or 4a-4b, can also be used to control the power generation from the wind turbine 1.

Figure 7:
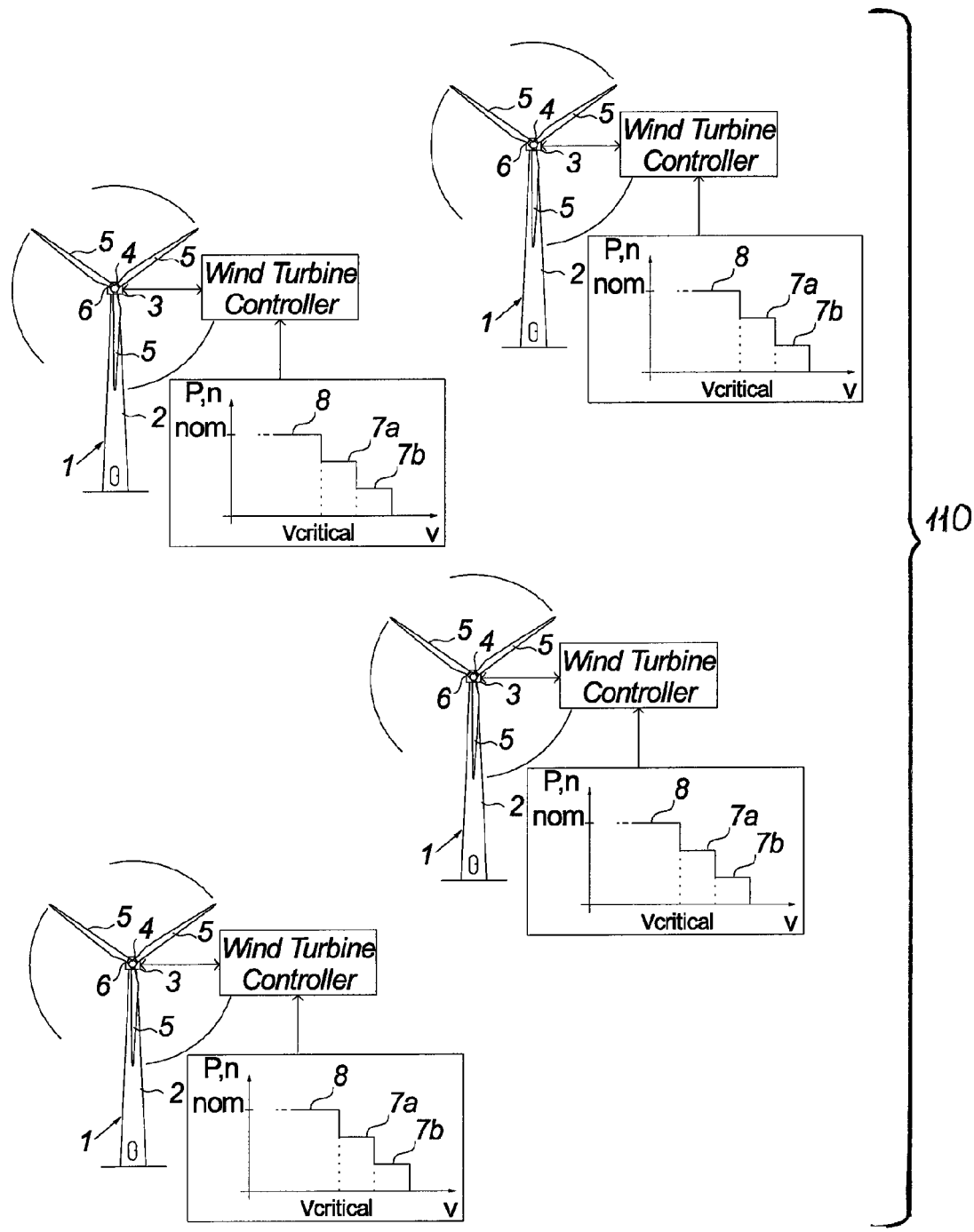
FIG. 7 illustrates schematically according to the invention, a cluster of wind turbines.

FIG. 7 is a schematic illustration of a cluster 110 of four wind turbines 1. As shown, each wind turbine 1 with has a tower 2 and a wind turbine nacelle 3 positioned on top of the tower. The wind turbine rotor, comprising three wind turbine blades 5, is connected to the hub 4 through pitch mechanisms 6. The pitch process is controlled by a wind turbine controller 105 comprising a pitch controller.

What is claimed is:

1. A method of operating a pitch controlled wind turbine at a wind velocity above a critical wind velocity value, comprising the step of controlling power generation from said pitch controlled wind turbine according to a non-continuous function relating power generation to wind velocity, said non-continuous function defining one or more secure ranges where said power generation will be below a nominal power value of the wind turbine but greater than zero.

2. The method of operating a pitch controlled wind turbine according to claim 1, wherein said secure ranges comprise wind velocity ranges where the power generation is controlled to be substantially constant.

3. The method of operating a pitch controlled wind turbine according to claim 1, wherein said secure ranges comprise wind velocity ranges where the power generation is controlled to be substantially constant with respect to an average representation or measure of power generation over a predefined period of time.

4. The method of operating a pitch controlled wind turbine according to claim 1, wherein said secure ranges comprise wind velocity ranges where the power generation is controlled to be substantially constant with respect to an average representation or measure of power generation over a first predefined period of time and wherein said power generation is controlled to allow a variation with respect to an average representation or measure of power generation over a following predefined period of time, wherein said following predefined period of time is shorter than said first predefined period of time.

5. The method of operating a pitch controlled wind turbine according to claim 1, wherein said secure ranges comprise wind velocity ranges where the power generation vary within the ranges.

6. The method of operating a pitch controlled wind turbine according to claim 1, wherein said secure ranges comprise wind velocity ranges where the operational speed of the rotor vary within the ranges.

7. The method of operating a pitch controlled wind turbine according to claim 1, wherein an operational speed of a rotor of said wind turbine increases over a short period of time in response to a reduction of power generation and increased wind velocity.

8. The method of operating a pitch controlled wind turbine according to claim 1, wherein said non-continuous function in said secure ranges represents a first average representation of measured power generation.

9. The method of operating a pitch controlled wind turbine according to claim 1, wherein said non-continuous function in said secure ranges represents power set points.

10. The method of operating a pitch controlled wind turbine according to claim 1, wherein said secure ranges comprise hysteresis for a decreasing wind velocity.

11. The method of operating a pitch controlled wind turbine according to claim 10, wherein said hysteresis is established in relation to parameters of the wind.

12. The method of operating a pitch controlled wind turbine according to claim 1, wherein levels of said secure ranges are defined in relation to fluctuation in the wind.

13. The method of operating a pitch controlled wind turbine according to claim 1, wherein a discrete number of secure ranges are established dependent on the fluctuation in wind.

14. The method of operating a pitch controlled wind turbine according to claim 13, wherein said discrete number is in the range of 1 to 10.

15. The method of operating a pitch controlled wind turbine according to claim 1, wherein said critical wind velocity value is dependent on fluctuation in the wind.

16. The method of operating a pitch controlled wind turbine according to claim 1, wherein said critical wind velocity value is defined dependent on forecasts of the wind.

17. The method of operating a pitch controlled wind turbine according to claim 1, wherein said critical wind velocity value is established on the basis of an average of actual wind velocity measurements.

18. A pitch controlled wind turbine comprising a wind turbine controller, wherein said wind turbine controller comprises a non-continuous function relating power generation to wind velocity, said non-continuous function defining one or more secure ranges where said power generation is below a nominal power value of the wind turbine but greater than zero, and wherein said wind turbine controller is arranged to control power generation from said pitch controlled wind turbine according to said non-continuous function when the wind velocity is above a critical wind velocity value.

19. The pitch controlled wind turbine according to claim 18, wherein said wind turbine is a double fed induction generator (DFIG) wind turbine.

20. A cluster of pitch controlled wind turbines comprising two or more wind turbines as claimed in claim 18.

21. The cluster of wind turbines according to claim 20, wherein wind velocity is measured centrally.

22. The cluster of wind turbines according to claim 20, wherein control parameters determined centrally.

* * * * *

UNITED STATES PATENT AND TRADEMARK OFFICE
CERTIFICATE OF CORRECTION

PATENT NO. : 7,948,104 B2
APPLICATION NO. : 12/607825
DATED : May 24, 2011
INVENTOR(S) : Brian W. Andersen It is certified that error appears in the above-identified patent and that said Letters Patent is hereby corrected as shown below:

At column 1, line approx. 52, "algorithms invokes that the up-down regulation is fast" should read -- algorithms result in the up-down regulation being fast --.

At column 3, line approx. 5-6, "generates varying rotor speeds over time is operational" should read -- generate varying rotor speeds over time is operationally --.

At column 3, line approx. 14, "is minimized" should read -- are minimized --.

At column 3, line approx. 16, "This in turns" should read -- This in turn --.

At column 3, line approx. 22, "steps represents" should read -- steps represent --.

At column 3, line approx. 45, "Bu the invention" should read -- By the invention --.

At column 4, line approx. 6, "range be" should read -- range can be --.

At column 4, line approx. 43, "does not" should read -- do not --.

At column 5, line approx. 43, "allows the" should read -- allow the --.

At column 6, line approx. 17, "wind comprise" should read -- wind comprises --.

At column 7, line approx. 44, "ad parameters" should read -- and parameters --.

At column 7, line approx. 60, "turbine 1 with has a" should read -- turbine 1 has a --.

At column 8, line approx. 11, "turbine 1 with has a" should read -- turbine 1 has a --.

In the Claims:

At column 8, claim number 5, line 49, "generation vary within" should read -- generation varies within --.

At column 8, claim number 6, line 55, "vary within" should read -- varies within --.

At column 10, claim 22, line approx. 22, "parameters determined" should read -- parameters are determined --.

Signed and Sealed this
Thirteenth Day of March, 2012

David J. Kappos
*Director of the United States Patent and Trademark Office*